United States Patent [19]

Müller

[11] Patent Number: 4,525,038
[45] Date of Patent: Jun. 25, 1985

[54] FISH EYE LENS SYSTEM

[76] Inventor: Rolf Müller, Wienerstr. 3, 7888 Rheinfelden, Fed. Rep. of Germany

[21] Appl. No.: 379,762

[22] Filed: May 19, 1982

[30] Foreign Application Priority Data

May 20, 1981 [DE] Fed. Rep. of Germany ....... 3119993

[51] Int. Cl.$^3$ ............................ G02B 9/60; G02B 9/62
[52] U.S. Cl. ....................................... 350/462; 350/436
[58] Field of Search ....................... 350/462, 436, 461

[56] References Cited

U.S. PATENT DOCUMENTS

| | | | |
|---|---|---|---|
| 3,734,600 | 5/1973 | Shimizu | 350/462 |
| 4,256,373 | 3/1981 | Horimoto | 350/464 |

*Primary Examiner*—John K. Corbin
*Assistant Examiner*—Rebecca D. Gass
*Attorney, Agent, or Firm*—Fitch, Even, Tabin & Flannery

[57] ABSTRACT

A high performance medium speed fish eye lens system is provided capable of compensating all aberrations except the distortion up to an aperture ratio of 1:4. The lens system includes a first negative meniscus shaped lens convex to the object, a second negative lens curved towards the object, a third positive lens curved towards the object, an aperture stop, a fourth positive lens curved towards the image and a fifth meniscus shaped negative lens convex to the image. The fourth and the fifth lens are close together or cemented. An optical filter can be inserted between the third and the fourth lens.

21 Claims, 12 Drawing Figures

FISH EYE LENS SYSTEM

BACKGROUND OF THE INVENTION

1. Field of the Invention

The present invention relates to a photographic fish eye lens system which has a field angle of more than 140°, particularly to an improved lens system having a very high resolution power at an aperture ratio up to 1:4 and which can be applied to SLR-cameras.

2. Description of the Prior Art

Fish eye lens systems are known since 1932 (DRP. No. 620,538). Further suggestions have been made in the "Journal of the Optical Society of America" No.41 (1951), Page 1058-1059 and in the U.S. Pat. No. 3,331,652. These early fish eye lens systems were rather simple and the compensation of some of the aberrations was not sufficient or was even impossible. Particularly the lateral chromatic aberration was a problem which could not be solved. Therefore the resolution power of these lens systems was poor, even if they were used at small aperture ratios. In the years following 1965 numerous fish eye lens systems of a higher performance have been designed, but the high number of lens elements is the common big disadvantage of these designs. They consist of 8 to 12 lens elements and they therefore are rather expensive and heavy (U.S. Pat. Nos. 3,515,462; 3,524,697; 3,597,049; 3,734,600; 3,741,630; 3,850,509; 4,009,943 and 4,256,373). Other disadvantages of some of these systems are the poor resolution power at large field angles and fully opened aperture stop, and—consequently—the decreasing brightness at the edges of the image, since the deviating light rays must be cut off by vignetting on the rims of the lens elements in order to achieve a sufficient sharpness of the image.

SUMMARY OF THE INVENTION

The purpose of the invention is to disclose a new fish eye lens system of rather simple construction and a very high resolution power at medium aperture ratios, to be used on SLR-cameras. At least one of the lens elements may desirably consist of a glass or crystal which has an abnormal characteristic of dispersion. In this regard, for example, the third lens (L3) may consist of a "short flint" glass, and/or the fourth lens may consist of a "long crown" glass or of a fluoride crystal. At least one of the lenses of the first lens group (G1) may consist of limpid plastic material which has an Abbe's number higher than 55.

The disclosed lens system consists of a first lens group (G1) including two single lenses (L1 and L2) of negative refractive power both curved towards the object; a second lens group (G2) of positive refractive power, including at least one positive lens (L3) curved towards
the object,
an aperture stop,
and a third lens group (G3) of positive refractive power, including a positive lens (L4) curved towards the image and a meniscus shaped negative lens convex to the image.

The design parameters of the disclosed fish eye lens system satisfy the following conditions: The first and the second lens of the first lens group (G1) consist of a glass of a Abbe's-number larger than 45 and the resulting focal length of the first lens group amounts to $-0.5$ to $-1.2$ f, the distance between the first and the second lens is 0.6 to 1 f, between the second and the third lens it is 0.9 to 1.3 f, the second lens group (G2) has a resulting focal length of 1.5 to 2.5 f and a resulting Abbe-number between 30 and 46, the distance between the second and the third lens group amounts to 0.5 to 0.9 f, the first lens of the third lens group has a focal length of 0.6 to 1.1 f and consists of a glass of an Abbe's-number larger than 52, the distance between the first and the second lens of the third group is less than 0.01 f, the second lens of the third lens group (G3) consists of a glass of a refractive index higher than 1.65 and an Abbe's-number less than 30, the radius of the object-facing side of said lens amounts to $-0.35$ to $-0.65$ f and the radius of the image side is $-0.8$ to $-1.4$ f, wherein f represents the resulting focal length of the entire lens system.

BRIEF DESCRIPTION OF THE PREFERRED EMBODIMENT

The first lens group (G1) consisting of two negative lenses L1 and L2 form the negative front member of the system, which is necessary for a retrofocus lens system for obtaining a long back focal length and a short effective focal length. The construction of this front member—according to the present invention—of two single curved lenses of a high negative refractive power is an especially simple embodiment of this front member, which enables the system to meet all requirements of a high performance fish eye lens system.

This front member largely contributes to the planing of the image field, since both lenses have a great negative contribution to the Petzval-sum. Moreover, especially the second negative lens L2 contributes with its concave surface which faces the image to the compensation of the aberrations of the following two lens groups by a negative coefficient of the spherical aberration, by a high negative coefficient of astigmatism and above all by a high positive coefficient of the coma.

But on the other hand, the negative front member introduces a considerable negative coefficient of lateral chromatic aberration and a positive coefficient of distortion into the system.

The second lens group consisting of preferably a single positive meniscus shaped lens L3, in which about 60% of the positive refractive power of the lens system is preferably concentrated, consists of a glass of relative low Abbe's-number-according to the invention—whereby a great portion of the lateral chromatic aberration, caused by the negative front member, and a small portion of the distortion can be compensated.

On the other side, the third lens causes—especially on its convex surface which faces the object—the highest positive coefficient of the spherical aberration and about 50% of all positive chromatic focal aberration coefficients of the entire system.

Thus, behind the second lens group, the spherical aberration coefficient and the chromatic focal aberration coefficient of the second lens group are dominating, while the sum of the coma and the distortion coefficients are substantially determined by the negative front member.

Behind the second lens group, the light-rays which are radiated by a distant object point, emerge nearly in parallel. It is therefore advantageous to arrange an optical filter in form of a plane-parallel glass plate F behind the second lens group—if necessary—for in this place a plane-parallel glass plate influences the achieved correction state of the system only slightly. Moreover, at this position the diameter of the filter can be very small, for—in accordance with the invention—the aperture stop is also arranged behind the second lens group.

The two lenses of the third lens group have a positive resulting refractive power, which represents approx. 40% of the positive refractive power of the entire lens system. The radii of the convex surface of the first lens of the third lens group and the concave surface of the second lens of said lens group are at least approximately equal, that is—according to the invention—between $-0.35$ and $-0.7$ f, wherein f represents the effective focal length of the entire lens system.

Since the refraction index of the second lens of the third lens group is considerably higher than the refraction index of the first lens of this group, the adjacent surfaces of these lenses—having a small distance or are cemented together—act divergent, and therefore are substantially contributing to the compensation of the spherical aberration.

Moreover, they cause an important contribution to the compensation of the chromatic focal aberration since the glass of the second lens of said lens group has a substantially higher Abbe's-number than the first lens of this group.

The convex surface of the second lens of this group, facing the image, adds a final important contribution to the spherical aberration and to the chromatic focal aberration. It also introduces a positive amount into the field curvature and the Petzval-sum, as well as a considerable negative coefficient of the coma.

A lens system according to the invention permits in the whole a very good compensation of all aberrations with exception of the distortion—up to an aperture ratio of about 1:4.5 to 1:4 and a field angle of about 150° to 180°.

EXAMPLES

The following typical and preferred examples of lens systems in accordance with the present invention are provided having the following design parameters wherein $n_i$ represents the radius of the i-th lens surface, $d_i$ represents the distance between the i-th and the next lens surface, $n_i$ represents the refraction index of the i-th lens, $v_i$ represents the Abbe's number of the i-th lens, S' represents the back focal length, f represents the effective paraxial focal length;

dB represents the distance between the aperture stop (B) and the lens surface preceding it on the object side, and Sigma 1 represents the field angle of the lens system from the center line of the lens system such that 2×Sigma 1 is the total object field angle of the lens system.

All numerical data herein, including the data presented by FIGS. 5–12, refer to lens systems which have a back focal length S' of about 37 mm, that is, to designs for the image size 24×36 mm, which however is not intended to limit lens elements of the present invention to this image size.

The following tables of data for each Example comprise the Seidel's-coefficients of lens systems according to the respective Example. The numerical data are multiplied by 1000 and rounded—by reasons of better clearness.

In the Tables, the variables are represented as follows:

H: abberation-coefficient of the spherical aberration

C: aberration-coefficient of the meridional coma

A: aberration-coefficient of the astigmatism

P: aberration-coefficient of the Petzval condition

W: aberration-coefficient of the curvature of the image field

D: aberration-coefficient of the distortion

FQ: aberration-coefficient of the lateral chromatic aberr.

FL: aberration-coefficient of the chromatic focal aberration

EXAMPLE 1

| | | | | | | |
|---|---|---|---|---|---|---|
| L1 | r1 = 45.995 | d1 = 1.37 | | n1 = 1.6935 | | v1 = 53.33 |
| | r2 = 18.8 | d2 = 12.233 | | | | |
| L2 | r3 = 147 | d3 = 1.762 | | n2 = 1.62015 | | v2 = 63.52 |
| | r4 = 13.896 | d4 = 18.398 | | | | |
| L3 | r5 = 16.3 | d5 = 3.308 | | n3 = 1.7205 | | v3 = 34.61 |
| | r6 = 63.8 | d6 = 10.88 | | dB = 8.8 | | |
| L4 | r7 = 46.974 | d7 = 3.62 | | n4 = 1.4863 | | v4 = 81.81 |
| | r8 = 7.93 | d8 = 0.01 | | | | |
| L5 | r9 = 7.95 | d9 = 2.41 | | n5 = 1.7618 | | v5 = 26.95 |
| | r10 = 17.3 | | | | | | f = 15.9577; $f_{res}$ = 15.8589; S' = 37.1541; 2 × Sigma 1 ≦ 153.5°

| I | H | C | A | P | W | D | FQ | FL |
|---|---|---|---|---|---|---|---|---|
| 1 | 10 | 17 | 29 | 141 | 199 | 293 | −4.5 | 3 |
| 2 | −570 | 153 | −41 | −345 | −427 | 103 | −2.4 | −9 |
| 3 | 70 | 80 | 95 | 41 | 231 | 162 | −4.2 | 4 |
| 4 | −9010 | 1425 | −225 | −437 | −887 | 105 | −3.1 | −20 |
| 5 | 48700 | −290 | 2 | 407 | 411 | −2 | 0.7 | 116 |
| 6 | 0 | −2 | −2 | −104 | −108 | −94 | 11.0 | −12 |
| 7 | 40 | 33 | 25 | 110 | 160 | 102 | −4.4 | 5 |
| 8 | 315160 | −2530 | 20 | 654 | 694 | −5 | 0.5 | 67 |
| 9 | −372730 | 3009 | −24 | −863 | −911 | 7 | −2.2 | −268 |
| 10 | 27280 | −1891 | 131 | 396 | 658 | −37 | 8.1 | 117 |
| Σ | 8960 | 4 | 10 | 2 | 21 | 633 | −0.3 | 2 |

Figure 1:
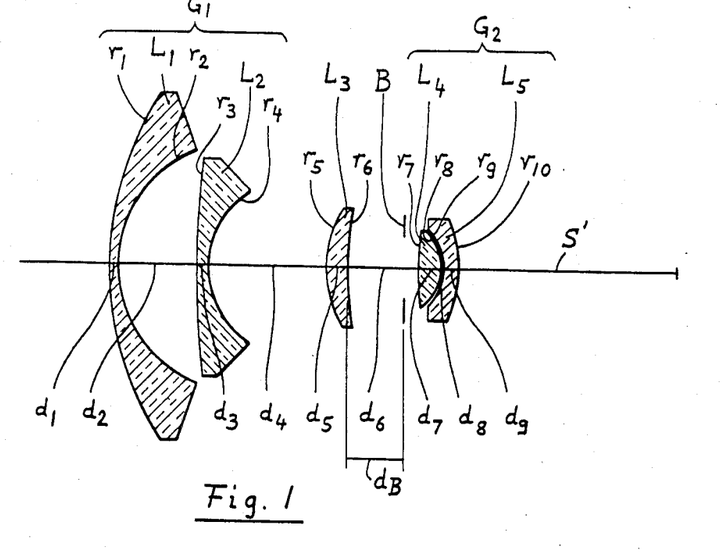
FIGS. 1, 2, 3 and 4 show longitudinal sections of fish eye lens systems according to the present invention.
Figure 2:
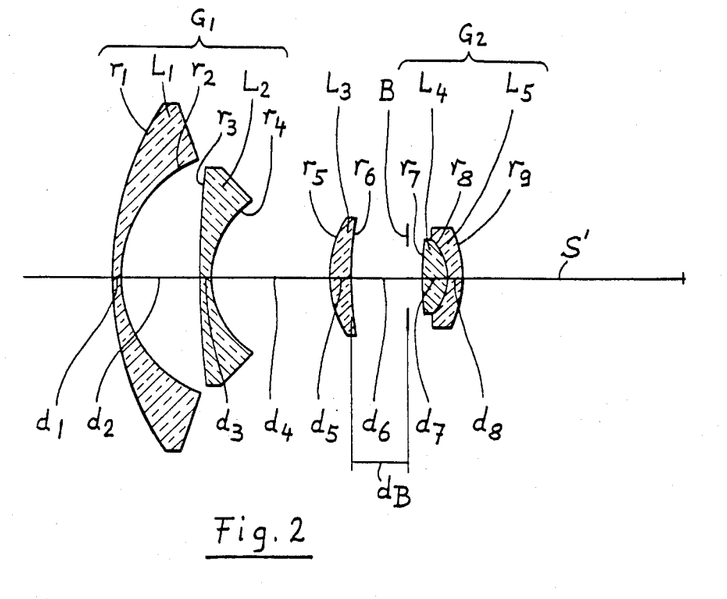
Figure 3:
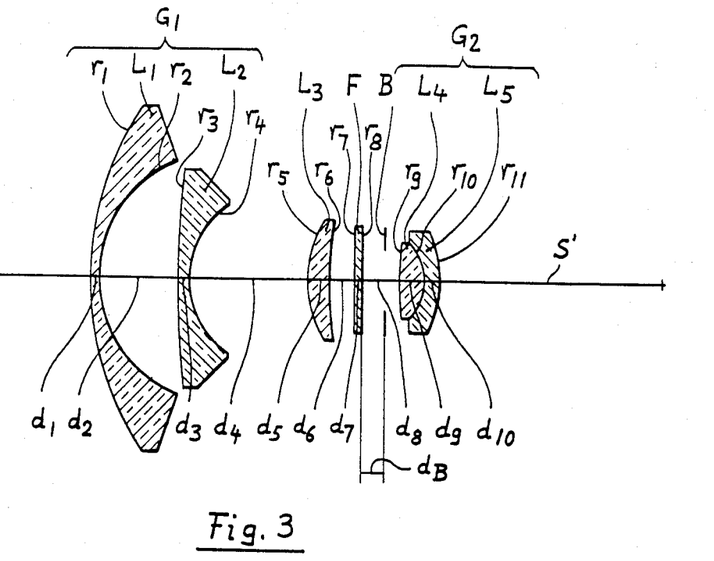
Figure 4:
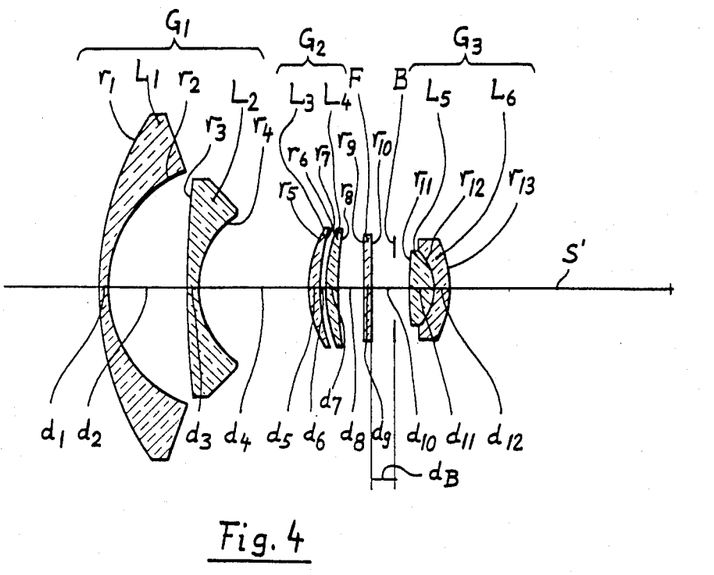
Figure 5:
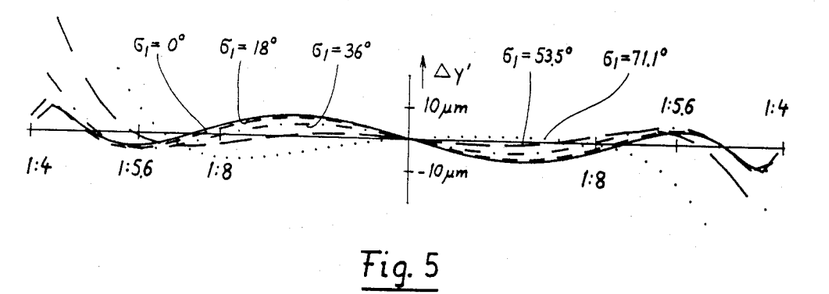
FIGS. 5, 6, 7, 8, 9, 10, 11 and 12 show meridional deviations delta-y' versus the aperture ratio at different field angles sigma 1 and the d-line.

TABLE 1 aberration-coefficients of a lens system according to Example 1. FIG. 5 illustrates meridional deviations delta-y' versus the aperture ratio at different field angles sigma 1 for the fisheye lens systems of Example 1.

EXAMPLE 2

| | | | | | | |
|---|---|---|---|---|---|---|
| L1 | r1 = 46.021 | d1 = 1.41 | | n1 = 1.6935 | | v1 = 53.33 |
| | r2 = 18.328 | d2 = 12.487 | | | | |
| L2 | r3 = 125 | d3 = 1.77 | | n2 = 1.6209 | | v2 = 60.31 |
| | r4 = 14.098 | d4 = 18.429 | | | | |
| L3 | r5 = 16.868 | d5 = 3.424 | | n3 = 1.7205 | | v3 = 34.61 |
| | r6 = 71.418 | d6 = 11.18 | | dB = 8.9 | | |
| L4 | r7 = 49.344 | d7 = 3.625 | | n4 = 1.4873 | | v4 = 81.81 |
| | r8 = 8.2224 | | | | | |
| L5 | r9 = 17.321 | d8 = 1.96 | | n5 = 1.7618 | | v5 = 26.95 | f = 15.8037; $f_{res}$ = 15.7051; S' = 37.0002; 2 × Sigma 1 ≦ 153.4°

| I | H | C | A | P | W | D | FQ | FL |
|---|---|---|---|---|---|---|---|---|
| 1 | 10 | 17 | 29 | 140 | 198 | 293 | −4,6 | 3 |
| 2 | −610 | 179 | −52 | −351 | −455 | 118 | −2,7 | −9 |
| 3 | 80 | 88 | 92 | 48 | 232 | 147 | −4,3 | 4 |
| 4 | −8830 | 1386 | −217 | −427 | −861 | 101 | −3,3 | −21 |
| 5 | 45220 | −205 | 1 | 390 | 392 | −2 | 0,5 | 113 |
| 6 | 0 | 2 | 2 | −92 | −88 | −95 | 11,1 | −11 |
| 7 | 30 | 28 | 22 | 104 | 148 | 100 | −4,1 | 5 |
| 8 | −54040 | 423 | −3 | −201 | −207 | 2 | −1,5 | −197 |
| 9 | 27170 | −1914 | 135 | 392 | 662 | −37 | 8,2 | 117 |

TABLE 1-continued aberration-coefficients of a lens system according to Example 1. FIG. 5 illustrates meridional deviations delta-y' versus the aperture ratio at different field angles sigma 1 for the fisheye lens systems of Example 1.

| Σ | 9030 | 3 | 8 | 3 | 19 | 627 | −0.6 | 5 |

Figure 6:
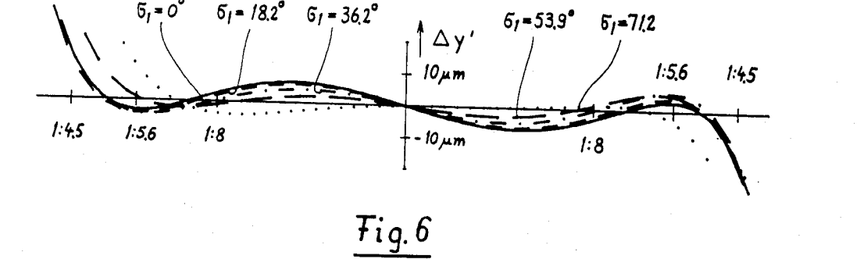

TABLE 2 aberration-coefficients of a lens system according to Example 2. FIG. 6 illustrates meridional deviations delta-y' versus the aperture ratio at different field angles sigma 1 for the fisheye lens system of Example 2.

EXAMPLE 3

| | | | | |
|---|---|---|---|---|
| L1 | r1 = 46.021 | d1 = 1.41 | n1 = 1.6935 | v1 = 53.33 |
| | r2 = 18.328 | d2 = 12.487 | | |
| L2 | r3 = 125 | d3 = 1.77 | n2 = 1.6209 | v2 = 60.31 |
| | r4 = 14.098 | d4 = 18.429 | | |
| L3 | r5 = 16.868 | d5 = 3.424 | n3 = 1.7205 | v3 = 34.61 |
| | r6 = 71.418 | d6 = 5 | | |
| F | r7 = ∞ | d7 = 1 | n4 = 1.54 | v4 = 60 |
| | r8 = ∞ | d8 = 5.56 | dB = 3.23 | |
| L4 | r9 = 49.344 | d9 = 3.625 | n5 = 1.4863 | v5 = 81.81 |
| L5 | r10 = −8.2224 | d10 = 1.97 | n6 = 1.7618 | v6 = 26.95 |
| | r11 = 17.321 | | | |

$f = 15.8034$; $f_{res} = 15.7050$; $S' = 36.9965$; $2 \times$ Sigma $1 \leq 153.4°$

| I | H | C | A | P | W | D | FQ | FL |
|---|---|---|---|---|---|---|---|---|
| 1 | 10 | 17 | 29 | 140 | 198 | 293 | −4,6 | 3 |
| 2 | −610 | 179 | −52 | −351 | −455 | 118 | −2,7 | −9 |
| 3 | 80 | 88 | 92 | 48 | 232 | 147 | −4,3 | 4 |
| 4 | −8830 | 1384 | −217 | −427 | −861 | 101 | −3,3 | −21 |
| 5 | 45220 | −195 | 1 | 390 | 392 | −2 | 0,5 | 113 |
| 6 | 0 | 2 | 2 | −92 | −88 | −95 | 11,1 | −11 |
| 7 | −10 | 27 | −53 | 0 | −106 | 101 | −6 | −3 |
| 8 | 10 | −27 | 52 | 0 | 104 | −101 | 6 | 3 |
| 9 | 30 | 28 | 22 | 104 | 148 | 100 | −4,1 | 5 |
| 10 | −54000 | 393 | −3 | −201 | −207 | 1 | −1,4 | −197 |
| 11 | 27160 | −1896 | 132 | 392 | 656 | −37 | 8,2 | 117 |
| Σ | 9060 | −1 | 6 | 3 | 16 | 628 | −0,6 | 5 |

Figure 7:
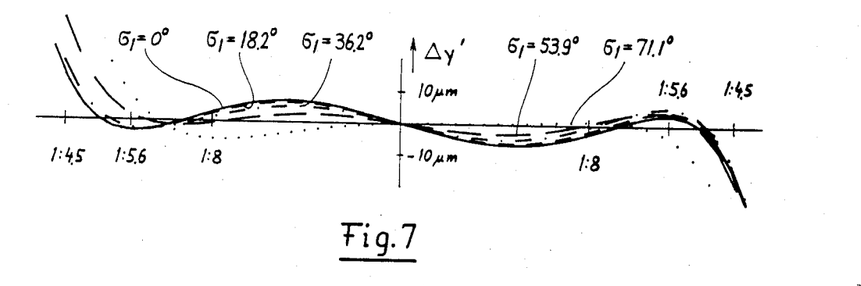

TABLE 3 aberration-coefficients of a lens system according to Example 3. FIG. 7 illustrates meridional deviations delta-y' versus the aperture ratio at different field angles sigma 1 for the fisheye lens system of Example 3.

EXAMPLE 4

| | | | | |
|---|---|---|---|---|
| L1 | r1 = 45.25 | d1 = 1.6 | n1 = 1.620141 | v1 = 60.33 |
| | r2 = 18.21 | d2 = 12.85 | | |
| L2 | r3 = 102.5 | d3 = 1.4 | n2 = 1.6910 | v2 = 54.71 |
| | r4 = 14.08 | d4 = 18.66 | | |
| L3 | r5 = 16.79 | d5 = 3.408 | n3 = 1.7205 | v3 = 34.61 |
| | r6 = 71.13 | d6 = 5 | | |
| F | r7 = ∞ | d7 = 1 | n4 = 1.54 | v4 = 60 |
| | r8 = ∞ | d8 = 5.43 | dB = 31 | |
| L4 | r9 = 49.11 | d9 = 3.608 | n5 = 1.4863 | v5 = 81.81 |
| L5 | r10 = −8.183 | d10 = 1.96 | n6 = 1.7618 | v6 = 26.96 |
| | r11 = −17.238 | | | |

$f = 15.8083$; $f_{res} = 15.7098$; $S' = 36.9991$; $2 \times$ Sigma $1 \leq 152.9°$

| I | H | C | A | P | W | D | FQ | FL |
|---|---|---|---|---|---|---|---|---|
| 1 | 10 | 16 | 27 | 133 | 187 | 262 | −3.6 | 2 |
| 2 | −530 | 160 | −48 | −330 | −426 | 115 | −2.2 | −7 |
| 3 | 80 | 86 | 94 | 63 | 251 | 171 | −5.1 | 5 |
| 4 | −8760 | 1392 | −221 | −456 | −898 | 108 | −3.8 | −24 |
| 5 | 45620 | −152 | 1 | 392 | 394 | −1 | 0.4 | 114 |
| 6 | 0 | 1 | 1 | −92 | −90 | −95 | 11.1 | −11 |
| 7 | −10 | 26 | −52 | 1 | −104 | 101 | −6 | −3 |
| 8 | 10 | −26 | 52 | 0 | 104 | −101 | 6 | 3 |
| 9 | 40 | 30 | 23 | 105 | 151 | 101 | −4.1 | 5 |
| 10 | −54600 | 389 | −3 | −202 | −208 | 1 | −1.4 | −197 |
| 11 | 27390 | −1905 | 132 | 394 | 658 | −37 | 8.2 | 117 |
| | 9250 | 17 | 5 | 5 | 16 | 625 | −0.6 | 4 |

Figure 8:
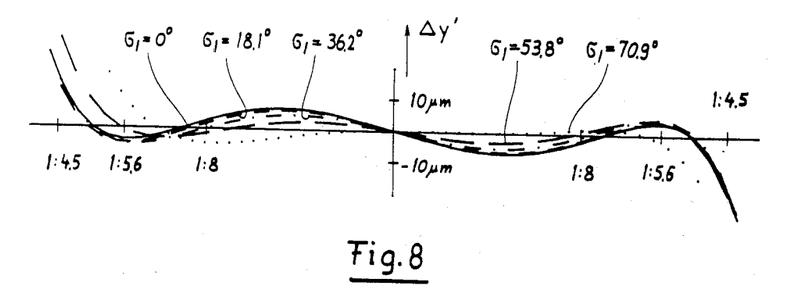

TABLE 4 aberration-coefficients of a lens system according to Example 4. FIG. 8 illustrates meridional deviations delta-y' versus the aperture ratio at different field angles sigma 1 for the fisheye lens system of Example 4.

EXAMPLE 5

| | | | | |
|---|---|---|---|---|
| L1 | r1 = 56.0 | d1 = 1.2 | n1 = 1.62015 | v1 = 63.52 |
| | r2 = 20.0 | d2 = 12.5 | | |
| L2 | r3 = 370 | d3 = 1.8 | n2 = 1.4863 | v2 = 81.81 |
| | r4 = 13.8 | d4 = 17.85 | | |
| L3 | r5 = 16.4 | d5 = 3.0 | n3 = 1.70181 | v3 = 41.01 |
| | r6 = 65.7 | d6 = 4.0 | | |
| F | r7 = ∞ | d7 = 1 | n4 = 1.518 | v4 = 60 |
| | r8 = ∞ | d8 = 6.45 | dB = 4.0 | |
| L4 | r9 = 57.5 | d9 = 3.7 | n5 = 1.53315 | v5 = 57.98 |
| L5 | r10 = −8.25 | d10 = 2.65 | n6 = 1.80518 | v6 = 25.43 |
| | r11 = 18.4 | | | |

$f = 16.8633$; $f_{res} = 16.7602$; $S' = 37.0414$; $2 \times$ Sigma $1 \leq 153.3°$

| I | H | C | A | P | W | D | FQ | FL |
|---|---|---|---|---|---|---|---|---|
| 1 | 10 | 14 | 30 | 115 | 175 | 316 | −3,9 | 2 |
| 2 | −540 | 132 | −32 | −321 | −385 | 87 | −1,7 | −7 |
| 3 | 20 | 38 | 93 | −15 | 171 | 192 | −3,3 | 1 |
| 4 | −8280 | 1328 | −213 | −397 | −823 | 98 | −2,1 | −13 |
| 5 | 41820 | −30 | 0 | 421 | 421 | 0 | 0,1 | 88 |
| 6 | 0 | −1 | −1 | −105 | −107 | −106 | 9,2 | −9 |
| 7 | −10 | 28 | −57 | 0 | −114 | 114 | −5,9 | −3 |
| 8 | 10 | −28 | 57 | 0 | 114 | −114 | 5,9 | 3 |
| 9 | 10 | 9 | 9 | 101 | 119 | 120 | −6,2 | 6 |
| 10 | −48360 | 248 | −1 | −200 | −202 | 1 | −0,9 | −179 |
| 11 | 23310 | −1726 | 128 | 406 | 662 | −40 | 8,5 | 115 |
| | 7990 | 11 | 13 | 6 | 32 | 668 | −0,4 | 4 |

Figure 9:
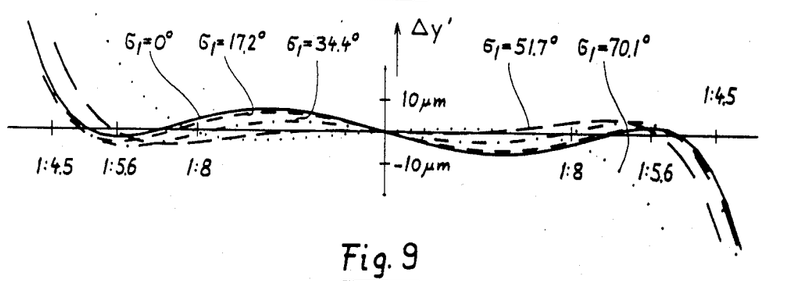

TABLE 5 aberration-coefficients of a lens system according to EXAMPLE 5. FIG. 9 illustrates meridional deviations delta-y' versus the aperture ratio at different field angles sigma 1 for the fisheye lens system of Example 5.

EXAMPLE 6

| | | | | |
|---|---|---|---|---|
| L1 | r1 = 48.28 | d1 = 1.325 | n1 = 1.62041 | v1 = 60.33 |
| | r2 = 18.177 | d2 = 11.834 | | |
| L2 | r3 = 137.3 | d3 = 1.704 | n2 = 1.623 | v2 = 58.06 |
| | r4 = 13.44 | d4 = 17.798 | | |
| L3 | r5 = 15.3 | d5 = 3.1998 | n3 = 1.6668 | v3 = 33.01 |
| | r6 = 65.0 | d6 = 10.65 | dB = 8.8 | |
| L4 | r7 = 47.0 | d7 = 3.503 | n4 = 1.51821 | v4 = 65.05 |
| L5 | r8 = −8.0 | d8 = 2.65 | n5 = 1.80518 | v5 = 25.43 |
| | r9 = 17.77 | | | |

$f = 15.9338$; $f_{res} = 15.8343$; $S' = 37.0463$; $2 \times$ Sigma $1 \leq 155.6°$

| I | H | C | A | P | W | D | FQ | FL |
|---|---|---|---|---|---|---|---|---|
| 1 | 10 | 16 | 27 | 133 | 187 | 262 | −3.6 | 2 |
| 2 | −530 | 160 | −48 | −330 | −426 | 115 | −2.2 | −7 |
| 3 | 80 | 86 | 94 | 63 | 251 | 171 | −5.1 | 5 |
| 4 | −8760 | 1392 | −221 | −456 | −898 | 108 | −3.8 | −24 |
| 5 | 45620 | −152 | 1 | 392 | 394 | −1 | 0.4 | 114 |
| 6 | 0 | 1 | 1 | −92 | −90 | −95 | 11.1 | −11 |
| 7 | −10 | 26 | −52 | 0 | −104 | 101 | −6 | −3 |
| 8 | 10 | −26 | 52 | 0 | 104 | −101 | 6 | 3 |
| 9 | 40 | 30 | 23 | 105 | 151 | 101 | −4.1 | 5 |
| 10 | −54600 | 389 | −3 | −202 | −208 | 1 | −1.4 | −197 |
| 11 | 27390 | −1905 | 132 | 394 | 658 | −37 | 8.2 | 117 |
| | 9250 | 17 | 5 | 5 | 16 | 625 | −0.6 | 4 |

Figure 10:
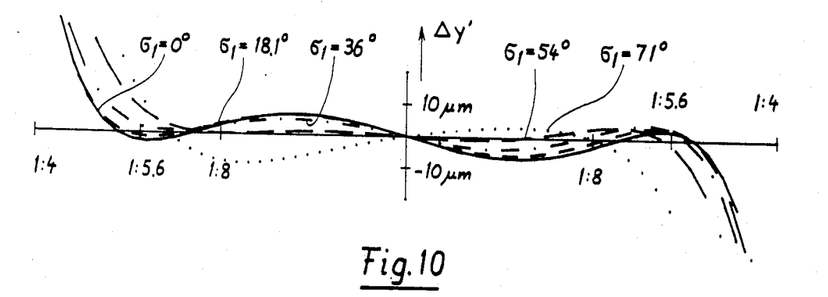

TABLE 6 aberration-coefficients of a lens system according to Example 6. FIG. 10 illustrates meridional deviations delta-y' versus the aperture ratio at current angles sigma 1 for the fisheye lens system of Example 6.

EXAMPLE 7

| | | | | |
|---|---|---|---|---|
| L1 | r1 = 139.9 | d1 = 1.27 | n1 = 1.523 | v1 = 59.6 |
| | r2 = 24.78 | d2 = 14.2 | | |
| L2 | r3 = ∞ | d3 = 1.9 | n2 = 1.492 | v2 = 58 |
| | r4 = 14.02 | d4 = 19.3 | | |

TABLE 6-continued aberration-coefficients of a lens system according to
Example 6. FIG. 10 illustrates meridional deviations delta-y'
versus the aperture ratio at current angles sigma 1
for the fisheye lens system of Example 6.

| | | | | | | |
|---|---|---|---|---|---|---|
| L3 | r5 = 16.66 | d5 = 2.35 | | n3 = 1.6668 | | v3 = 33.01 |
| | r6 = 82.24 | d6 = 10.69 | | dB = 5.6 | | |
| L4 | r7 = −221.4 | d7 = 2.53 | | n4 = 1.53113 | | v4 = 62.15 |
| | r8 = −7.539 | | | | | |
| L5 | r9 = −14.234 | d8 = 0.60 | | n5 = 1.80518 | | v5 = 25.43 | f = 17,4182; f$_{res}$ = 17.3172; S' = 38.6576; 2 × Sigma 1 ≦ 159.4°.

| I | H | C | A | P | W | D | FQ | FL |
|---|---|---|---|---|---|---|---|---|
| 1 | 0 | 3 | 20 | 43 | 83 | 433 | −4,9 | 1 |
| 2 | −324 | 42 | −5 | −240 | −250 | 32 | −0,7 | −6 |
| 3 | 18 | 41 | 90 | 0 | 180 | 199 | −4,7 | 2 |
| 4 | −8093 | 1060 | −139 | −407 | −685 | 72 | −2,5 | −19 |
| 5 | 41349 | 1678 | 68 | 416 | 552 | 20 | −4,4 | 107 |
| 6 | 7 | 14 | 27 | −84 | −30 | −111 | 11,8 | −6 |
| 7 | −101 | 92 | −83 | −27 | −193 | 100 | −5,3 | −6 |
| 8 | −61961 | −1226 | −24 | −228 | −276 | −5 | 4,1 | −208 |
| 9 | 41082 | −1677 | 68 | 543 | 679 | −25 | 5,9 | 144 |
| Σ | 11980 | 26 | 22 | 15 | 58 | 714 | −0,7 | 9 |

Figure 11:
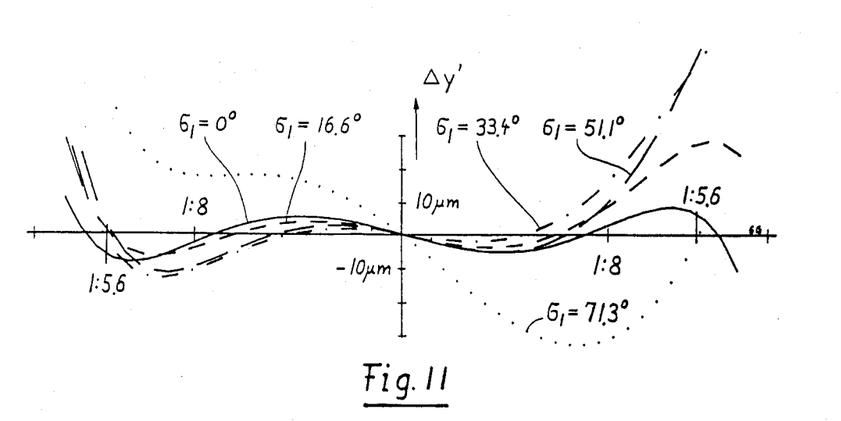

TABLE 7 aberration coefficients of a lens system according
to Example 7. FIG. 11 illustrates
meridional deviations delta-y' versus the aperture ratio
at different field angles sigma 1 for the fisheye lens
system of Example 7.

EXAMPLE 8

| | | | | | | |
|---|---|---|---|---|---|---|
| L1 | r1 = 54.45 | d1 = 1.6 | | n1 = 1.6986 | | v1 = 55.41 |
| | r2 = 18.256 | d2 = 13.86 | | | | |
| L2 | r3 = 74.25 | d3 = 1.4 | | n2 = 1.6968 | | v2 = 56.18 |
| | r4 = 14.0085 | d4 = 18.81 | | | | |
| L3 | r5 = 16.4835 | d5 = 3.374 | | n3 = 1.6727 | | v3 = 32.21 |
| | r6 = 81.18 | d6 = 5 | | | | |
| F | r7 = ∞ | d7 = 1 | | n4 = 1.54 | | v4 = 60 |
| | r8 = ∞ | d8 = 5.35 | | dB = 3.0 | | |
| L4 | r9 = 48.51 | d9 = 3.572 | | n5 = 1.48656 | | v5 = 84.47 |
| L5 | r10 = −8.3061 | d10 = 1.782 | | n6 = 1.80518 | | v6 = 25.43 |
| | r11 = −16.3944 | | | | | | f = 14.3854; f$_{res}$ = 14.2955; S' = 36.9973; 2 × Sigma 1 ≦ 170.8°

| I | H | C | A | P | W | D | FQ | FL |
|---|---|---|---|---|---|---|---|---|
| 1 | 4 | 11 | 28 | 108 | 164 | 343 | −4,9 | 2 |
| 2 | −529 | 169 | −54 | −322 | −430 | 120 | −2,6 | −8 |
| 3 | 147 | 110 | 82 | 79 | 243 | 120 | −4,5 | 6 |
| 4 | −9018 | 1342 | −200 | −419 | −819 | 92 | −3,7 | −25 |
| 5 | 48156 | −105 | 0 | 349 | 349 | −1 | 0.3 | 127 |
| 6 | 2 | 2 | 2 | −71 | −67 | −79 | 11.6 | −10 |
| 7 | −11 | 22 | −43 | 0 | −86 | 84 | −6 | −3 |
| 8 | 11 | −22 | 43 | 0 | 86 | −84 | 6 | 3 |
| 9 | 55 | 38 | 26 | 96 | 148 | 84 | −4 | 6 |
| 10 | −62478 | 424 | −3 | −204 | −210 | 1 | −1.6 | −241 |
| 11 | 33492 | −1993 | 119 | 389 | 627 | −30 | 8.7 | 146 |
| Σ | 9830 | −2 | 1 | 5 | 7 | 651 | −0,7 | 3 |

Figure 12:
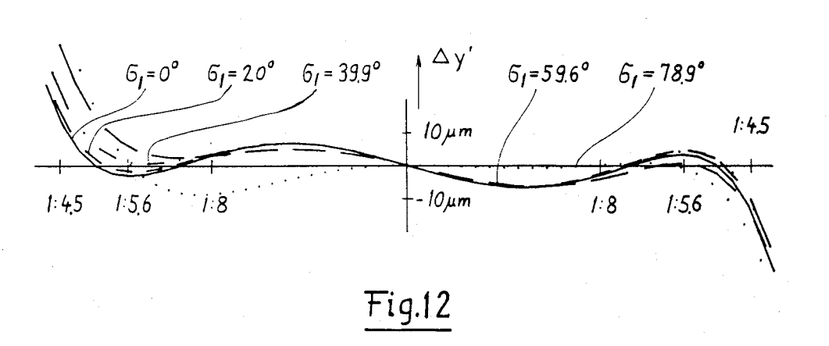

TABLE 8 aberration-coefficients of a lens system according to
Example 8. FIG. 12 illustrates meridional deviations delta y'
versus the aperture ratio at differrent field angles
sigma 1 for the fisheye lens system of Example 8.
While the previous Examples illustrate 5-lens systems,
this Example illustrates a six element fish eye lens system.

EXAMPLE 9

| | | | | | | |
|---|---|---|---|---|---|---|
| L1 | r1 = 42.2 | d1 = 1.6 | | n1 = 1.62041 | | v1 = 60.33 |
| | r2 = 17.7 | d2 = 13.−5 | | | | |
| L2 | r3 = 87.0 | d3 = 1.4 | | n2 = 1.713 | | v2 = 53.83 |
| | r4 = 14.15 | d4 = 18.56 | | | | |
| L3 | r5 = 17.5 | d5 = 1.75 | | n3 = 1.69981 | | v3 = 34.68 |
| | r6 = 29.83 | d6 = 0.7 | | | | |
| L4 | r7 = 28.0 | d7 = 2.07 | | n4 = 1.69981 | | v4 = 34.68 |
| | r8 = 80.8 | d8 = 4.85 | | | | |
| F | r9 = ∞ | d9 = 1 | | n5 = 1.54 | | v5 = 60 |
| | r10 = ∞ | d10 = 5.42 | | dB = 3.3 | | |
| L5 | r11 = 51 | d11 = 3.608 | | n6 = 1.4863 | | v6 = 81.81 |

TABLE 8-continued aberration-coefficients of a lens system according to
Example 8. FIG. 12 illustrates meridional deviations delta y'
versus the aperture ratio at differrent field angles
sigma 1 for the fisheye lens system of Example 8.
While the previous Examples illustrate 5-lens systems,
this Example illustrates a six element fish eye lens system.

| | | | | | | |
|---|---|---|---|---|---|---|
| L6 | r12 = 8.45 | d12 = 1.3 | | n7 = 1.7618 | | v7 = 26.95 |
| | r13 = 17.5 | | | | | | f = 15.8572; f$_{res}$ = 15.7566; S' = 37.0826; 2 × Sigma 1 ≦ 150.1°

| I | H | C | A | P | W | D | FQ | FL |
|---|---|---|---|---|---|---|---|---|
| 1 | 10 | 16 | 29 | 126 | 184 | 291 | −3,9 | 2 |
| 2 | −580 | 155 | −42 | −334 | −418 | 101 | −2,0 | −7 |
| 3 | 70 | 80 | 96 | 44 | 236 | 168 | −4,6 | 4 |
| 4 | −9340 | 1505 | −243 | −452 | −938 | 112 | −3,5 | −22 |
| 5 | 51290 | −546 | 6 | 414 | 426 | −4 | 1,3 | 118 |
| 6 | −10 | −7 | −6 | −97 | −109 | −93 | 11,0 | −12 |
| 7 | 50 | 39 | 29 | 115 | 173 | 107 | −5,4 | 7 |
| 8 | −58630 | 665 | −8 | −207 | −223 | 2 | −2,3 | −206 |
| 9 | 26240 | −1951 | 145 | 397 | 687 | −40 | 9,3 | 125 |
| Σ | 9110 | −44 | 7 | 6 | 21 | 644 | −0,3 | 9 |

A lens system according to the present invention can be modified in many ways in order to obtain particular characteristics according to the desired application, whereby the basic design of the lens system as set forth in claim 1, 2 or 17 remains unchanged. Some of these modifications which have especially appropriate characteristics in different aspects are set forth in the Examples 1–9 by numerical design parameters. All numerical data as well as the presented drawings of aberration curves refer to lens systems which have a back focal length S' of about 37 mm, that is to designs for the image size 24×36 mm, but this means no limitation of the invention to this image size.

A displacement of the image field versus the theoretically paraxial image position by −0.273 mm is the base for the presented curves of deviations. This displacement corresponds to the practical focusing of the lens system in order to achieve a maximal visual contrast at opened aperture stop. It follows a resulting focal length f$_{res}$, being shorter than the theoretical effective focal length f by about 0.1 mm, which is the result of calculations concerning paraxial rays. The given field angles sigma 1, the aperture ratios and the Seidel's -coefficients of the Tables 1 to 8 also refer to this resulting focal length f$_{res}$.

What I claim is:

1. A five element fish eye lens system comprising from the object to the image side:
   a first meniscus shaped lens (L1) of negative refractive power curved towards the object,
   a second lens (L2) of negative refractive power curved towards the object,
   a third positive meniscus lens (L3) of positive refractive power curved towards the object,
   an aperture stop (B),
   a fourth lens (L4) of positive refractive power curved towards the image, and
   a fifth meniscus shaped lens (L5) of negative refractive power curved towards the image.

2. A fish eye lens system according to claim 1 wherein said first lens and said second lens each consist of a glass having an Abbe-number larger than 45, wherein said lens group formed by said first lens and said second lens has a focal length in the range of −0.5 to −1.2 f, wherein the distance between said first lens and said second lens is in the range of 0.9 to 1.3 f, wherein said third lens has a focal length in the range of 1.5 to 2.5 f and an Abbe-number between 30 and 46, wherein said fourth lens has a focal length in the range of 0.6 to 1.1 f and consists of a glass of an Abbe-number larger than 52, and wherein said fifth lens consists of a glass having a refractive index higher than 1.65, and an Abbe-number less than 30, wherein f represents the resulting focal length of the lens system.

3. A fish eye lens system according to claim 2, wherein the distance between said fourth lens and said fifth lens is less than 0.01 f, wherein the radius of the object-facing side of said fifth lens is in the range of from −0.35 f to −0.65 f and wherein the radius of the image-facing side of said fifth lens is in the range of from −0.8 f to −1.4 f.

4. A five element fish eye lens system comprising five lens elements from the object to the image side:
 a first meniscus shaped lens (L1) of negative refractive power made from a glass of an Abbe's number higher than 45 curved towards the object,
 a second lens (L2) of negative refractive power made from a glass of an Abbe's number higher than 45 and curved towards the object, said second lens forming together with said first lens (L1) a first lens group, which has a resulting focal length of −0.5 to −1.2 f,
 a single third lens (L3) of positive refractive power curved towards the object and made from a glass of a relatively high refraction index and low Abbe's number, said third lens having a focal length of 1.5 to 2.5 f,
 an aperture stop,
 a fourth lens (L4) of positive refractive power curved towards the image and made from a glass of an Abbe's number higher than 52, having a radius of −0.35 to −0.7 f on its surface facing the image side, and
 a fifth meniscus shaped lens (L5) of negative refractive power made from a glass of a refraction index higher than 1.65 and an Abbe's number less than 30, said fifth lens having a radius of −0.35 to −0.7 f on its surface facing the object side and a radius of −0.8 to −1.4 f on its surface facing the image side, said fourth lens and said fifth lens forming a lens group,
 wherein f represents the effective focal length of the entire lens system.

5. A fish eye lens system according to claim 4 having the following design parameters, wherein
 $r_i$ represents the radius of the i-th lens surface,
 $d_i$ represents the distance between the i-th and the next lens surface,
 $n_i$ represents the refraction index of the i-th lens,
 $v_i$ represents the Abbe's number of the i-th lens,
 S' represents the back focal length,
 f represents the effective paraxial focal length,
 $f_{res}$ represents the resulting focal length, which provides maximum visual contrast at opened aperture stop,
 dB represents the distance between the aperture stop and the lens surface preceding it on the object side,
 $2 \times$ Sigma 1 represents the total field angle:

| L1 | r1 = 45.995 | d1 = 1.37 | n1 = 1.6935 | v1 = 53.33 |
|---|---|---|---|---|
|  | r2 = 18.8 | d2 = 12.233 |  |  |
| L2 | r3 = 147 | d3 = 1.762 | n2 = 1.62015 | v2 = 63.52 |
|  | r4 = 13.896 | d4 = 18.398 |  |  |
| L3 | r5 = 16.3 | d5 = 3.308 | n3 = 1.7205 | v3 = 34.61 |

-continued

| | r6 = 63.8 | d6 = 10.88 | | dB = 8.8 |
|---|---|---|---|---|
| L4 | r7 = 46.974 | d7 = 3.62 | n4 = 1.4863 | v4 = 81.81 |
|  | r8 = 7.93 | d8 = 0.01 |  |  |
| L5 | r9 = 7.95 | d9 = 2.41 | n5 = 1.7618 | v5 = 26.95 |
|  | r10 = 17.3 |  |  |  | f = 15.9577; $f_{res}$ = 15.8589; S' = 37.1541; $2 \times$ Sigma 1 ≦ 153.5°.

6. A fish eye lens system according to claim 4 wherein the lenses of the third lens group (G3) are cemented.

7. A fish eye lens system according to claim 6 having the following design parameters wherein
 $r_i$ represents the radius of the i-th lens surface,
 $d_i$ represents the distance between the i-th and the next lens surface,
 $n_i$ represents the refraction index of the i-th lens,
 $v_i$ represents the Abbe's number of the i-th lens,
 S' represents the back focal length,
 f represents the effective paraxial focal length,
 $f_{res}$ represents the resulting focal length, which provides maximum visual contrast at opened aperture stop,
 dB represents the distance between the aperture stop and the lens surface preceding it on the object side,
 $2 \times$ Sigman 1 represents the total field angle:

| L1 | r1 = 46.021 | d1 = 1.41 | n1 = 1.6935 | v1 = 53.33 |
|---|---|---|---|---|
|  | r2 = 18.328 | d2 = 12.487 |  |  |
| L2 | r3 = 125 | d3 = 1.77 | n2 = 1.6209 | v2 = 60.31 |
|  | r4 = 14.098 | d4 = 18.429 |  |  |
| L3 | r5 = 16.868 | d5 = 3.424 | n3 = 1.7205 | v3 = 34.61 |
|  | r6 = 71.418 | d6 = 11.18 |  | dB = 8.9 |
| L4 | r7 = 49.344 | d7 = 3.625 | n4 = 1.4873 | v4 = 81.81 |
|  | r8 = −8.2224 |  |  |  |
| L5 | r9 = 17.321 | d8 = 1.96 | n5 = 1.7618 | v5 = 26.95 | f = 15.8037; $f_{res}$ = 15.7051; S' = 37.0002; $2 \times$ Sigma 1 ≦ 153.4°.

8. A fish eye lens system according to claim 6 having the following design parameters wherein
 $r_i$ represents the radius of the i-th lens surface,
 $d_i$ represents the distance between the i-th and the next lens surface,
 $n_i$ represents the refraction index of the i-th lens,
 $v_i$ represents the Abbe's number of the i-th lens,
 S' represents back focal length,
 f represents the effective paraxial focal length,
 $f_{res}$ represents the resulting focal length, which provides maximum visual contrast at opened aperture stop,
 dB represents the distance between the aperture stop and the lens surface preceding it on the object side,
 $2 \times$ Sigma 1 represents the total field angle:

| L1 | r1 = 48.28 | d1 = 1.325 | n1 = 1.62041 | v1 = 60.33 |
|---|---|---|---|---|
|  | r2 = 18.177 | d2 = 11.834 |  |  |
| L2 | r3 = 137.3 | d3 = 1.704 | n2 = 1.623 | v2 = 58.06 |
|  | r4 = 13.44 | d4 = 17.798 |  |  |
| L3 | r5 = 15.3 | d5 = 3.1998 | n3 = 1.6668 | v3 = 33.01 |
|  | r6 = 65.0 | d6 = 10.65 |  | dB = 8.8 |
| L4 | r7 = 47.0 | d7 = 3.503 | n4 = 1.51821 | v4 = 65.05 |
| L5 | r8 = −8.0 | d8 = 2.65 | n5 = 1.80518 | v5 = 25.43 |
|  | r9 = 17.77 |  |  |  | f = 15.9338; $f_{res}$ = 15.8343; S' = 37.0463; $2 \times$ Sigma 1 ≦ 155.6°.

9. A fish eye lens system according to claim 6 wherein at least one of the lenses of the first lens group (G1) consists of limpid plastic material which has an Abbe's-number higher than 55.

10. A fish eye lens system according to claim 9 having the following design parameters wherein
   $r_i$ represents the radius of the i-th lens surface,
   $d_i$ represents the distance between the i-th and the next lens surface,
   $n_i$ represents the refraction index of the i-th lens,
   $v_i$ represents the Abbe's number of the i-th lens,
   S' represents back focal length,
   f represents the effective paraxial focal length,
   $f_{res}$ represents the resulting focal length, which provides maximum visual contrast at opened aperture stop,
   dB represents the distance between the aperture stop and the lens surface preceding it on the object side,
   $2 \times$ Sigma 1 represents the total field angle:

| | | | | |
|---|---|---|---|---|
| L1 | r1 = 139.9 | d1 = 1.27 | n1 = 1.523 | v1 = 59.6 |
| | r2 = 24.78 | d2 = 14.02 | | |
| L2 | r3 = ∞ | d3 = 1.9 | n2 = 1.492 | v2 = 58 |
| | r4 = 14.02 | d4 = 19.3 | | |
| L3 | r5 = 16.66 | d5 = 2.35 | n3 = 1.6668 | v3 = 33.01 |
| | r6 = 82.24 | d6 = 10.69 | dB = 5.6 | |
| L4 | r7 = −221.4 | d7 = 2.53 | n4 = 1.53113 | v4 = 62.15 |
| | r8 = −7.539 | | | |
| L5 | r9 = −14.234 | d8 = 0.60 | n5 = 1.80518 | v5 = 25.43 |
| f = 17.4182; $f_{res}$ = 17.3172; S' = 38.6576; $2 \times$ Sigma 1 ≦ 159.4°. | | | | |

11. A fish eye lens system according to claim 6 further comprising a plane-parallel filter element (F).

12. A fish eye lens system according to claim 11 having the following design parameters wherein
   $r_i$ represents the radius of the i-th lens surface,
   $d_i$ represents the distance between the i-th and the next lens surface,
   $n_i$ represents the refraction index of the i-th lens,
   $v_i$ represents Abbe's number of the i-th lens,
   S' represents the back focal length,
   f represents the effective paraxial focal length,
   $f_{res}$ represents the resulting focal length, which provides maximum visual contrast at opened aperture stop,
   dB represents the distance between the aperture stop and the lens surface preceding it on the object side,
   $2 \times$ Sigma 1 represents the total field angle:

| | | | | |
|---|---|---|---|---|
| L1 | r1 = 46.021 | d1 = 1.41 | n1 = 1.6935 | v1 = 53.33 |
| | r2 = 18.328 | d2 = 12.487 | | |
| L2 | r3 = 125 | d3 = 1.77 | n2 = 1.6209 | v2 = 60.31 |
| | r4 = 14.098 | d4 = 18.429 | | |
| L3 | r5 = 16.868 | d5 = 3.424 | n3 = 1.7205 | v3 = 34.61 |
| | r6 = 71.418 | d6 = 5 | | |
| F | r7 = ∞ | d7 = 1 | n4 = 1.54 | v4 = 60 |
| | r8 = ∞ | d8 = 5.56 | dB = 3.23 | |
| L4 | r9 = 49.344 | d9 = 3.625 | n5 = 1.4863 | v5 = 81.81 |
| L5 | r10 = −8.2224 | d10 = 1.97 | n6 = 1.7618 | v6 = 26.95 |
| | r11 = 17.321 | | | |
| f = 15.8034; $f_{res}$ = 15.7050; S' = 36.9965; $2 \times$ Sigma 1 ≦ 153.4°. | | | | |

13. A fish eye lens system according to claim 11 having the following design parameters wherein:
   $r_i$ represents the radius of the i-th lens surface,
   $d_i$ represents the distance between the i-th and the next lens surface,
   $n_i$ represents the refraction index of the i-th lens,
   $v_i$ represents the Abbe's number of the i-th lens,
   S' represents the back focal length,
   f represents the effective paraxial focal length,
   $f_{res}$ represents the resulting focal length, which provides maximum visual contrast at opened aperture stop,
   dB represents the distance between the aperture stop and the lens surface preceding it on the object side,
   $2 \times$ Sigma 1 represents the total field angle:

| | | | | |
|---|---|---|---|---|
| L1 | r1 = 45.25 | d1 = 1.6 | n1 = 1.620141 | v1 = 60.33 |
| | r2 = 18.21 | d2 = 12.85 | | |
| L2 | r3 = 102.5 | d3 = 1.4 | n2 = 1.6910 | v2 = 54.71 |
| | r4 = 14.08 | d4 = 18.66 | | |
| L3 | r5 = 16.79 | d5 = 3.408 | n3 = 1.7205 | v3 = 34.61 |
| | r6 = 71.13 | d6 = 5 | | |
| F | r7 = ∞ | d7 = 1 | n4 = 1.54 | v4 = 60 |
| | r8 = ∞ | d8 = 5.43 | dB = 31 | |
| L4 | r9 = 49.11 | d9 = 3.608 | n5 = 1.4863 | v5 = 81.81 |
| L5 | r10 = −8.183 | d10 = 1.96 | n6 = 1.7618 | v6 = 26.95 |
| | r11 = −17.238 | | | |
| f = 15.8083; $f_{res}$ = 15.7098; S' = 36.9991; $2 \times$ Sigma 1 ≦ 152.9°. | | | | |

14. A fish eye lens system according to claim 11 having the following design parameters wherein
   $r_i$ represents the radius of the i-th lens surface,
   $d_i$ represents the distance between the i-th and the next lens surface,
   $n_i$ represents the refraction index of the i-th lens,
   $v_i$ represents the Abbe's number of the i-th lens,
   S' represents back focal length,
   f represents the effective paraxial focal length,
   $f_{res}$ represents the resulting focal length, which provides maximum visual contrast at opened aperture stop,
   dB represents the distance between the aperture stop and the lens surface preceding it on the object side,
   $2 \times$ Sigma 1 represents the total field angle:

| | | | | |
|---|---|---|---|---|
| L1 | r1 = 56.0 | d1 = 1.2 | n1 = 1.62015 | v1 = 63.52 |
| | r2 = 20.0 | d2 = 12.5 | | |
| L2 | r3 = 370 | d3 = 1.8 | n2 = 1.4863 | v2 = 81.81 |
| | r4 = 13.8 | d4 = 17.85 | | |
| L3 | r5 = 16.4 | d5 = 3.0 | n3 = 1.70181 | v3 = 41.01 |
| | r6 = 65.7 | d6 = 4.0 | | |
| F | r7 = ∞ | d7 = 1 | n4 = 1.518 | v4 = 60 |
| | r8 = ∞ | d8 = 6.45 | dB = 4.0 | |
| L4 | r9 = 57.5 | d9 = 3.7 | n5 = 1.53315 | v5 = 57.98 |
| L5 | r10 = −8.25 | d10 = 2.65 | n6 = 1.80518 | v6 = 25.43 |
| | r11 = 18.4 | | | |
| f = 16.8633; $f_{res}$ = 16.7602; S' = 37.0414; $2 \times$ Sigma 1 ≦ 153.3°. | | | | |

15. A fish eye lens system according to claim 11 having the following design parameters wherein
   $r_i$ represents the radius of the i-th lens surface,
   $d_i$ represents the distance between the i-th and the next lens surface,
   $n_i$ represents the refraction index of the i-th lens,
   $v_i$ represents the Abbe's number of the i-th lens,
   S' represents the back focal length,
   f represents the effective paraxial focal length,
   $f_{res}$ represents the resulting focal length, which provides maximum visual contrast at opened aperture stop,
   dB represents the distance between the aperture stop and the lens surface preceding it on the object side,
   $2 \times$ Sigma 1 represents the total field angle:

| | | | | |
|---|---|---|---|---|
| L1 | r1 = 54.45 | d1 = 1.6 | n1 = 1.6968 | v1 = 55.41 |
| | r2 = 18.256 | d2 = 13.86 | | |
| L2 | r3 = 74.25 | d3 = 1.4 | n2 = 1.6968 | v2 = 56.18 |
| | r4 = 14.0085 | d4 = 18.81 | | |
| L3 | r5 = 16.4835 | d5 = 3.374 | n3 = 1.6727 | v3 = 32.21 |
| | r6 = 81.18 | d6 = 5 | | |
| F | r7 = ∞ | d7 = 1 | n4 = 1.54 | v4 = 60 |
| | r8 = ∞ | d8 = 5.35 | dB = 3.0 | |
| L4 | r9 = 48.51 | d9 = 3.572 | n5 = 1.48656 | v5 = 84.47 |

-continued

| L5 | r10 = −8.3061 | d10 = 1.782 | n6 = 1.80518 | v6 = 25.43 |
| | r11 = −16.3944 | | | |

$f = 14.3854;\ f_{res} = 14.2955;\ S' = 36.9973;\ 2 \times \text{Sigma 1} \leq 170.8°$.

16. A fish eye lens system according to claim 4 or 6 wherein at least one of the lens elements consist of a glass or crystal which has an abnormal characteristic of dispersion.

17. A fish eye lens system according to claim 16 wherein the third lens (L3) consists of a "short flint"-glass.

18. A fish eye lens system according to claim 16 wherein the fourth lens consists of a "long crown"-glass.

19. A fisheye lens system according to claim 16 wherein said fourth lens consists of a fluoride-crystal.

20. A fish eye lens system comprising six lens elements in three groups in the following manner, from the object to the image side:

a first meniscus shaped lens (L1) of negative refractive power curved towards the object, a second lens (L2) of negative refractive power curved towards the object and forming—together with the first lens (L1)—a first lens group (G1), a third positive meniscus shaped lens (L3) of positive refractive power curved towards the object, a fourth positive meniscus lens (L4) of positive refractive power curved towards the object and forming—together with the third lens (L3)—a second lens group (G2), an aperture stop (B), a fifth lens (L5) of positive refractive power curved towards the image, and a sixth meniscus shaped lens (L6) of negative refractive power curved towards the image and forming—together with the fifth lens (L5)—a third lens group (G3).

21. A fish eye lens system according to claim 20 having the following design parameters wherein $r_i$ represents the radius of the i-th lens surface, $d_i$ represents the distance between the i-th and the next lens surface, $n_i$ represents the refraction index of the i-th lens, $v_i$ represents the Abbe's number of the i-th lens, S' represents the back focal length, f represents the effective paraxial focal length, $f_{res}$ represents the resulting focal length, which provides maximum visual contrast at opened aperture stop, dB represents the distance between the aperture stop and the lens surface preceding it on the object side, $2 \times \text{Sigma 1}$ represents the total field angle:

| | | | | |
|---|---|---|---|---|
| L1 | r1 = 42.2 | d1 = 1.6 | n1 = 1.62041 | v1 = 60.33 |
| | r2 = 17.7 | d2 = 13.−5 | | |
| L2 | r3 = 87.0 | d3 = 1.4 | n2 = 1.713 | v2 = 53.83 |
| | r4 = 14.15 | d4 = 18.56 | | |
| L3 | r5 = 17.5 | d5 = 1.75 | n3 = 1.69981 | v3 = 34.68 |
| | r6 = 29.83 | d6 = 0.7 | | |
| L4 | r7 = 28.0 | d7 = 2.0 | n4 = 1.69981 | v4 = 34.68 |
| | r8 = 80.8 | d8 = 4.85 | | |
| F | r9 = ∞ | d9 = 1 | n5 = 1.54 | v5 = 60 |
| | r10 = ∞ | d10 = 5.42 | dB = 3.3 | |
| L5 | r11 = 51 | d11 = 3.608 | n6 = 1.4863 | v6 = 81.81 |
| L6 | r12 = 8.45 | d12 = 1.3 | n7 = 1.7618 | v7 = 26.95 |
| | r13 = 17.5 | | | |

$f = 15.8572;\ f_{res} = 15.7566;\ S' = 37.0826;\ 2 \times \text{Sigma 1} \leq 150.1°$.

* * * * *

UNITED STATES PATENT AND TRADEMARK OFFICE
CERTIFICATE OF CORRECTION

PATENT NO. : 4,525,038　　　　　　　　　　Sheet 1 of 5

DATED : June 25, 1985

INVENTOR(S) : Rolf Müller

It is certified that error appears in the above-identified patent and that said Letters Patent is hereby corrected as shown below:

Col. 3, Line 52, change "$n_i$" to --$r_i$--.

Col. 4, Lines 44-50, identify "TABLE 1" with the block of tabulated numbers above it by deleting the horizontal line immediately below "TABLE 1" and expanding upwardly the printed matter so that the subtitle "TABLE 1" appears immediately subjacent the horizontal line above it.

Col. 4, Line 58, change "r8 = 8.2224" to --r8 = -8.2224--.

Col. 5, Line 1, change "TABLE 1-continued" to --TABLE 2-continued--.

Col. 5, Lines 2-6, delete the two horizontal lines and all printed matter therebetween.

Col. 5, Lines 9-15, identify "TABLE 2" with the block of tabulated numbers preceding it by deleting the horizontal line immediately below "TABLE 2" and expanding upwardly the printed matter so that the subtitle "TABLE 2" appears immediately subjacent the horizontal line above it.

UNITED STATES PATENT AND TRADEMARK OFFICE
CERTIFICATE OF CORRECTION

PATENT NO. : 4,525,038
DATED : June 25, 1985
INVENTOR(S) : Rolf Müller

It is certified that error appears in the above-identified patent and that said Letters Patent is hereby corrected as shown below:

Col. 5, Lines 39-45, identify "TABLE 3" with the block of tabulated numbers above it by deleting the horizontal line immediately below "TABLE 3" and expanding upwardly the printed matter so that the subtitle "TABLE 3" appears immediately subjacent the horizontal line above it.

Col. 5, Line 63, in column "P", line 7, change "1" to --0--.

Col. 5, Line 67, col. I insert --$\Sigma$--.

Col. 6, Line 1, identify "TABLE 4" with the block of tabulated numbers preceding it by deleting the horizontal line immediately below "TABLE 4" and moving the subtitle "TABLE 4" to appear immediately subjacent the bottom horizontal line of Col. 5.

Col. 6, Line 29, col. I insert --$\Sigma$--.

Col. 6, Lines 30-36, identify "TABLE 5" with the block of tabulated numbers above it by deleting the horizontal line immediately below "TABLE 5" and expanding upwardly the printed matter so that the subtitle "TABLE 5" appears immediately subjacent the horizontal line above it.

UNITED STATES PATENT AND TRADEMARK OFFICE
CERTIFICATE OF CORRECTION

PATENT NO. : 4,525,038

DATED : June 25, 1985

INVENTOR(S) : Rolf Müller

It is certified that error appears in the above-identified patent and that said Letters Patent is hereby corrected as shown below:

Col. 6, Lines 47 through 57 delete the entire table of tabulated numbers and substitute therefor the following:

| I | H | C | A | P | W | D | FQ | FL |
|---|---|---|---|---|---|---|---|---|
| 1 | 10 | 16 | 29 | 126 | 184 | 291 | -3.9 | 2 |
| 2 | -580 | 155 | -42 | -334 | -418 | 101 | -2.0 | -7 |
| 3 | 70 | 80 | 96 | 44 | 236 | 168 | -4.6 | 4 |
| 4 | -9340 | 1505 | -243 | -452 | -938 | 112 | -3.5 | -22 |
| 5 | 51290 | -546 | 6 | 414 | 426 | -4 | 1.3 | 118 |
| 6 | -10 | -7 | -6 | -97 | -109 | -93 | 11.0 | -12 |
| 7 | 50 | 39 | 29 | 115 | 173 | 107 | -5.4 | 7 |
| 8 | -58630 | 665 | -8 | -207 | -223 | 2 | -2.3 | -206 |
| 9 | 26240 | -1951 | 145 | 397 | 687 | -40 | 9.3 | 125 |
| $\Sigma$ | 9110 | -44 | 7 | 6 | 21 | 644 | -0.3 | 9 |

Col. 6, Lines 58-64, identify "TABLE 6" with the block of tabulated numbers to be substituted in the block above it by deleting the horizontal line immediately below "TABLE 6" and expanding upwardly the printed matter so that the subtitle "TABLE 6" appears immediately subjacent the horizontal line above it.

Col. 6, Line 66, change "d2 = 14.2" to --d2 = 14.02--.

Col. 7, Line 1, change "TABLE 6-continued" to --EXAMPLE 7-continued--.

UNITED STATES PATENT AND TRADEMARK OFFICE
CERTIFICATE OF CORRECTION

PATENT NO. : 4,525,038    Sheet 4 of 5

DATED : June 25, 1985

INVENTOR(S) : Rolf Müller

It is certified that error appears in the above-identified patent and that said Letters Patent is hereby corrected as shown below:

Col. 7, Lines 2-5, delete both horizontal lines and all printed matter therebetween.

Col. 7, Lines 22-28, identify "TABLE 7" with the block of tabulated numbers above it by deleting the horizontal line immediately below "TABLE 7" and expanding upwardly the printed matter so that the subtitle "TABLE 7" appears immediately subjacent the horizontal line above it.

Col. 7, Line 29, change "n1 = 1.6986" to --n1 = 1.6968--.

Col. 7, Line 55, change "delta y'" to --delta-y'--.

Col. 7, Lines 51-58, identify "TABLE 8" with the block of tabulated numbers above it by deleting the horizontal line immediately below "TABLE 8" and expanding upwardly the printed matter so that the subtitle "TABLE 8" appears immediately subjacent the horizontal line above it.

Col. 7, Line 65, change "d7 = 2.07" to --d7 = 2.0--.

UNITED STATES PATENT AND TRADEMARK OFFICE
CERTIFICATE OF CORRECTION

PATENT NO. : 4,525,038

DATED : June 25, 1985

INVENTOR(S) : Rolf Müller

It is certified that error appears in the above-identified patent and that said Letters Patent is hereby corrected as shown below:

Col. 8, Line 1, change "TABLE 8-continued" to --EXAMPLE 9-continued--.

Col. 8, Lines 2-8, delete both horizontal lines and the printed matter therebetween.

Col. 8, Lines 11-20, delete the entire table.

Col. 10, Line 26, change "Sigman" to --Sigma--.

Signed and Sealed this

Twenty-fifth Day of April, 1989

Attest:

DONALD J. QUIGG

Attesting Officer   Commissioner of Patents and Trademarks